(12) United States Patent
Alvanos et al.

(10) Patent No.: US 7,770,375 B2
(45) Date of Patent: Aug. 10, 2010

(54) PARTICLE COLLECTOR FOR GAS TURBINE ENGINE

(75) Inventors: Ioannis Alvanos, West Springfield, MA (US); Bernard A. Andrews, Hamden, CT (US); Robert A. Charbonneau, Meriden, CT (US); Susan M. Tholen, Kennebunk, ME (US); Thurman Carlo Dabbs, Dover, NH (US); Michael J. Bruskotter, Cape Neddick, ME (US)

(73) Assignee: United Technologies Corporation, Hartford, CT (US)

( * ) Notice: Subject to any disclaimer, the term of this patent is extended or adjusted under 35 U.S.C. 154(b) by 967 days.

(21) Appl. No.: 11/350,494

(22) Filed: Feb. 9, 2006

(65) Prior Publication Data

US 2007/0183887 A1    Aug. 9, 2007

(51) Int. Cl.
  *F02G 3/00*    (2006.01)
(52) U.S. Cl. .................... 60/39.091; 415/121.2; 55/306
(58) Field of Classification Search .............. 60/39.092, 60/39.091; 415/115, 121.2; 416/95, 96 R; 55/306, 307, 308
See application file for complete search history.

(56) References Cited

U.S. PATENT DOCUMENTS

| | | | | |
|---|---|---|---|---|
| 3,483,676 A | * | 12/1969 | Sargisson | 55/306 |
| 3,673,771 A | * | 7/1972 | Dickey | 55/306 |
| 3,970,439 A | * | 7/1976 | Murphy | 55/306 |
| 4,304,094 A | * | 12/1981 | Amelio | 60/39.092 |
| 4,767,425 A | * | 8/1988 | Camplin et al. | 55/306 |
| 4,798,047 A | * | 1/1989 | Geary | 60/39.092 |
| 5,222,693 A | * | 6/1993 | Slutzkin et al. | 244/53 B |
| 6,398,837 B1 | * | 6/2002 | Alvin et al. | 55/486 |
| 2005/0053460 A1 | * | 3/2005 | Czachor et al. | 415/116 |

FOREIGN PATENT DOCUMENTS

| | | |
|---|---|---|
| JP | 02-248630 | 10/1990 |
| JP | 06-033981 | 2/1994 |
| JP | 11-141353 | 5/1999 |

* cited by examiner

*Primary Examiner*—William H Rodriguez
*Assistant Examiner*—Phutthiwat Wongwian
(74) *Attorney, Agent, or Firm*—Carlson, Gaskey & Olds

(57) ABSTRACT

A material having a plurality of impurity collection spaces has an outer face facing into a cooling air flow stream for a gas turbine engine component. Impurities such as sand or dirt will collect in the plurality of spaces. In a disclosed embodiment, a honeycombed material is utilized. The material may have a surface that will sit with at least a component parallel to an axial centerline of a gas turbine engine that is to receive the collection material. The material surface may also have a component which is generally perpendicular to the axial centerline. The material may be placed in a gas turbine engine upstream of the turbine section, and downstream of the combustion section. Moreover, the collection material may be placed such that there is cleaner air flow radially inwardly of the collection material, and heavier dirt-laden air passing along the collection material such that impurities can be collected.

16 Claims, 5 Drawing Sheets

PARTICLE COLLECTOR FOR GAS TURBINE ENGINE

BACKGROUND OF THE INVENTION

This application relates to the inclusion of a material into air flow streams in a gas turbine engine, wherein the material has a plurality of collection zones for collecting impurities such as dirt or sand.

Gas turbine engines are provided with a number of functional sections, including a fan section, a compressor section, a combustion section, and a turbine section. Air and fuel are combusted in the combustion section. The products of the combustion move downstream, and pass over a series of turbine rotors, driving the rotors to provide power.

Numerous components within the gas turbine engine are subject to high levels of heat during operation. As an example, a turbine rotor will have a plurality of turbine blades that are driven by high temperature products of combustion to rotate and create the power. Cooling fluid, and typically air, is passed within a body of the turbine blades, seals, and vanes to cool the components.

The air passing through a gas turbine engine is often subjected to dirt and other impurities. It is desirable that the air utilized for cooling various components be relatively clean. The cooling of the components is through relatively small passages, and the dirt and impurities can clog those small passages.

Gas turbine engines are known to have utilized a honeycombed material as an abradable seal between a stationary surface and a rotating surface. As the rotating surface rotates, the abradable seal is worn to closely fit in the interface between the stationary and rotating surface. However, these honeycombed materials have not been placed in the cooling air flow such as mentioned above.

SUMMARY OF THE INVENTION

In the disclosed embodiment of this invention, a cooling air stream for being delivered to a component in a gas turbine engine passes along a material having a plurality of collection zones in an outer face. In one disclosed embodiment, the material has a honeycombed face to collect impurities such as sand or dirt. By including this material, the present invention removes impurities and other particles to a high degree. In general, the material is preferably placed on a plane that has at least a component parallel to a general direction of movement of the cooling air. In this manner, the air is not simply directed into the material, but rather moves along the material such that the impurities can fall into the collection zones.

In disclosed embodiments, the material may be placed at a radially outer portion of a cooling air flow path. In one embodiment, there are two distinct material sections placed on planes that are transverse to each other to better collect the impurities. In another embodiment, a flow guide guides air into the materials for collection of impurities.

In another embodiment, the material is associated with a metering hole for cooling air, and at least partially "shadows" the hole.

These and other features of the present invention can be best understood from the following specification and drawings, the following of which is a brief description.

DETAILED DESCRIPTION OF THE PREFERRED EMBODIMENT

Figure 1:
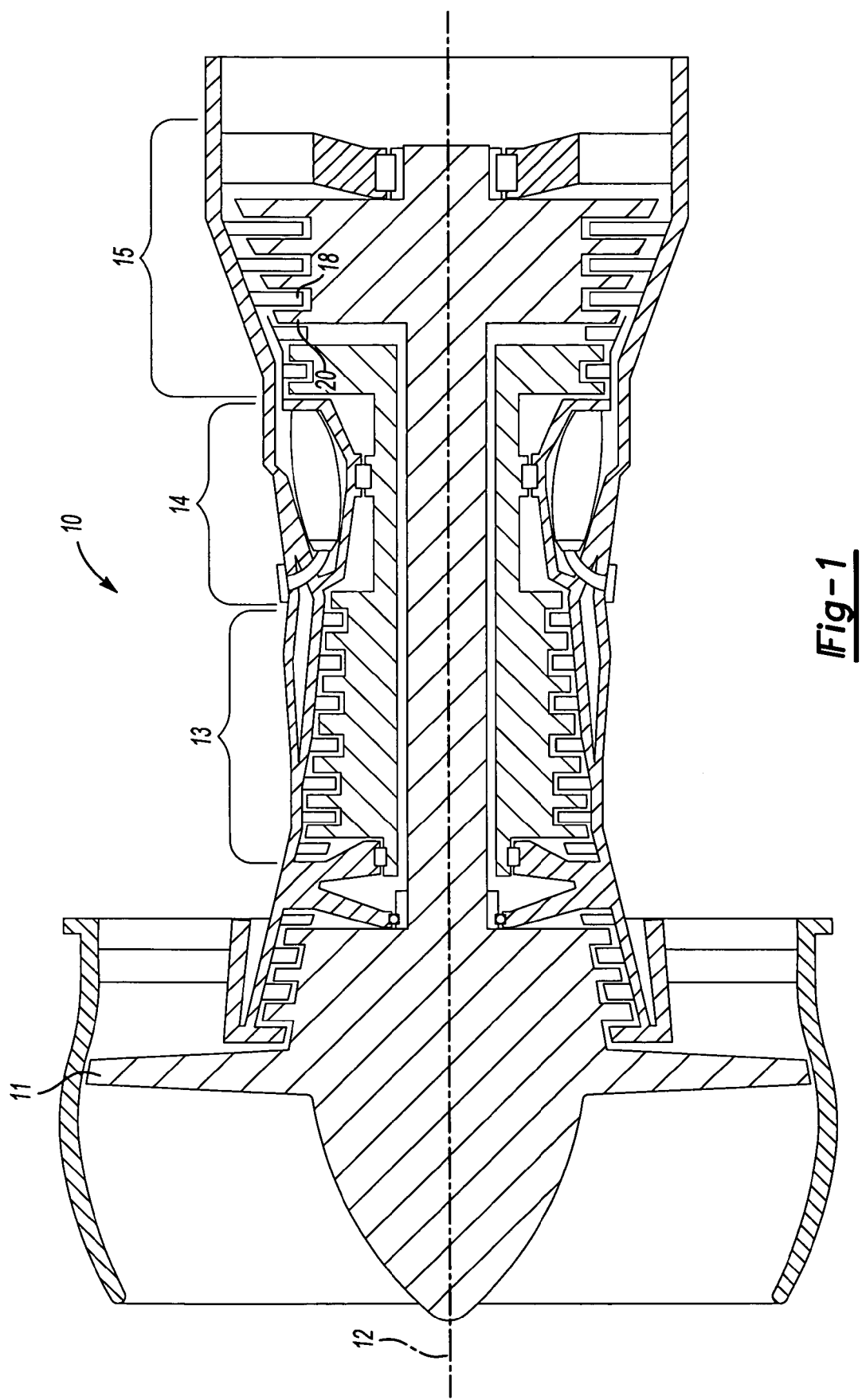
FIG. 1 is a cross-sectional view through a schematic gas turbine engine.

FIG. 1 shows a gas turbine engine 10. As known, a fan section 11 moves air and rotates about an axial center line 12. A compressor section 13, a combustion section 14, and a turbine section 15 are also centered on the axial center line 12. FIG. 1 is a highly schematic view, however, it does show the main components of the gas turbine engine. Further, while a particular type of gas turbine engine is illustrated in this figure, it should be understood that the present invention extends to other types of gas turbine engines.

Figure 2:
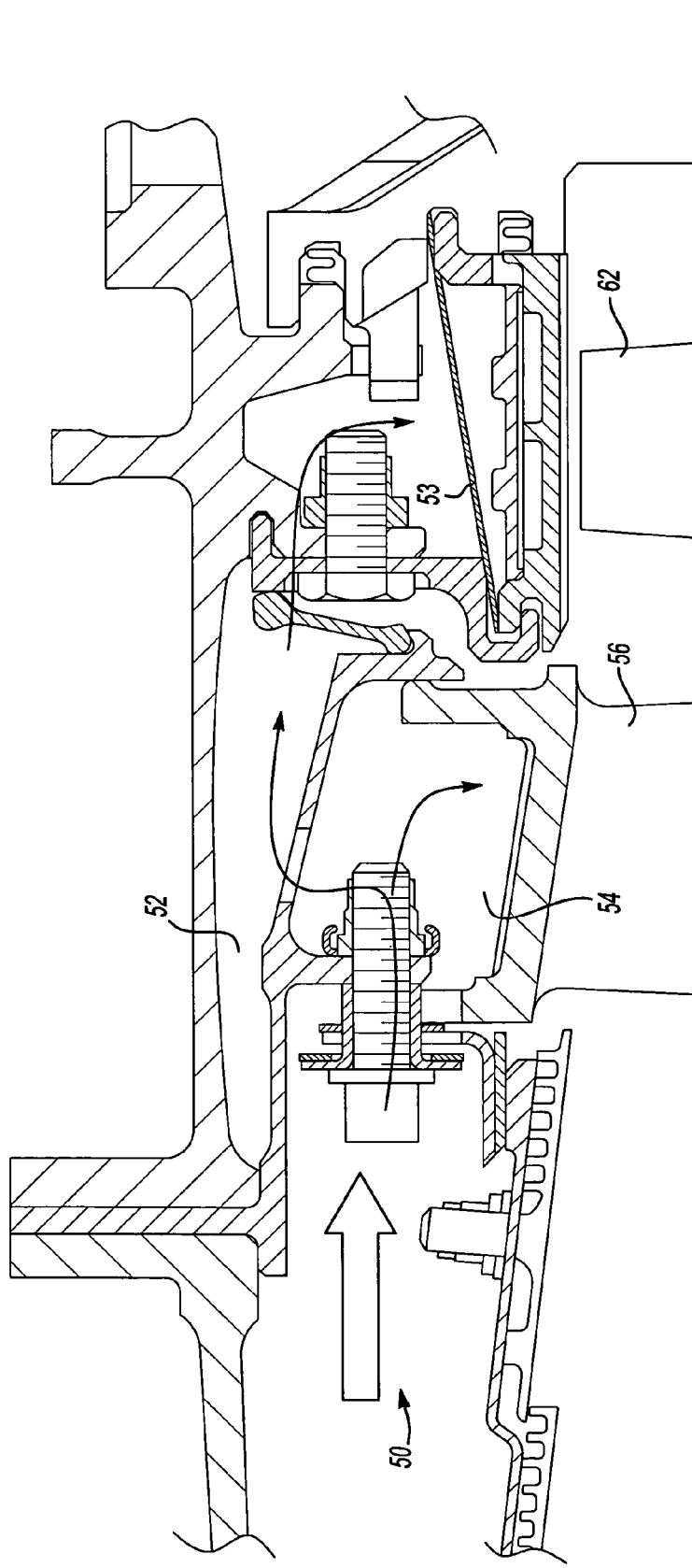
FIG. 2 shows a first location of a cooling air stream.

FIG. 2 shows a detail of a cooling air flow 50 which may pass radially outwardly through an outer cooling air path 52 to a blade outer air seal 53. As is known, the blade outer air seal 53 is positioned radially outwardly of a rotating turbine blade 62. An inner air flow path passes cooling air to a stationary vane 56 and to blade 62.

Figure 3:
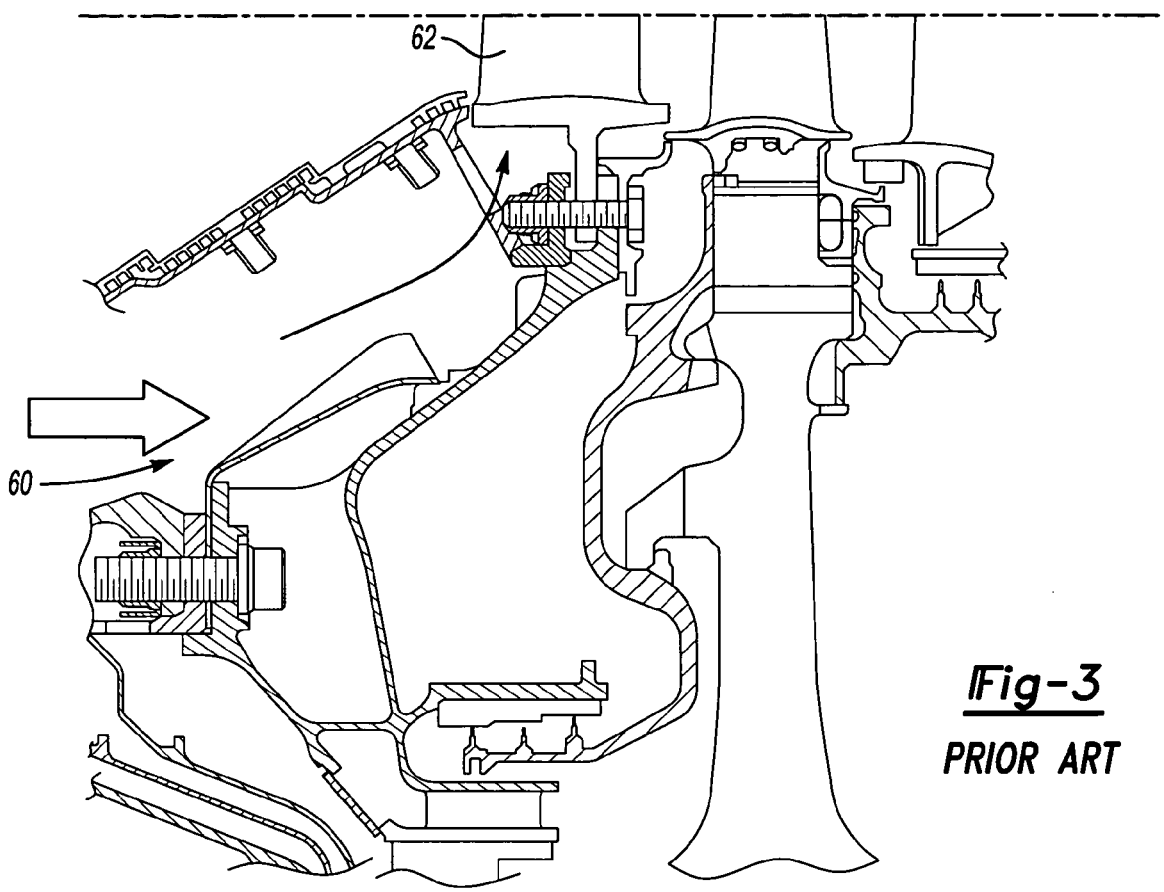
FIG. 3 shows another example cooling air stream.

FIG. 3 shows an inner cooling air flow 60 passing cooling air to an interior passage within a stationary turbine vane 62. As mentioned above, in the prior art, all of these cooling air paths supply cooling air to relatively small passages (not shown) within components such as the blade outer air seal 53, the vane 56, or the turbine blade 62. Those relatively small cooling air passages can become clogged should impurities such as sand or dirt be included in these cooling air flows.

Figure 4A:
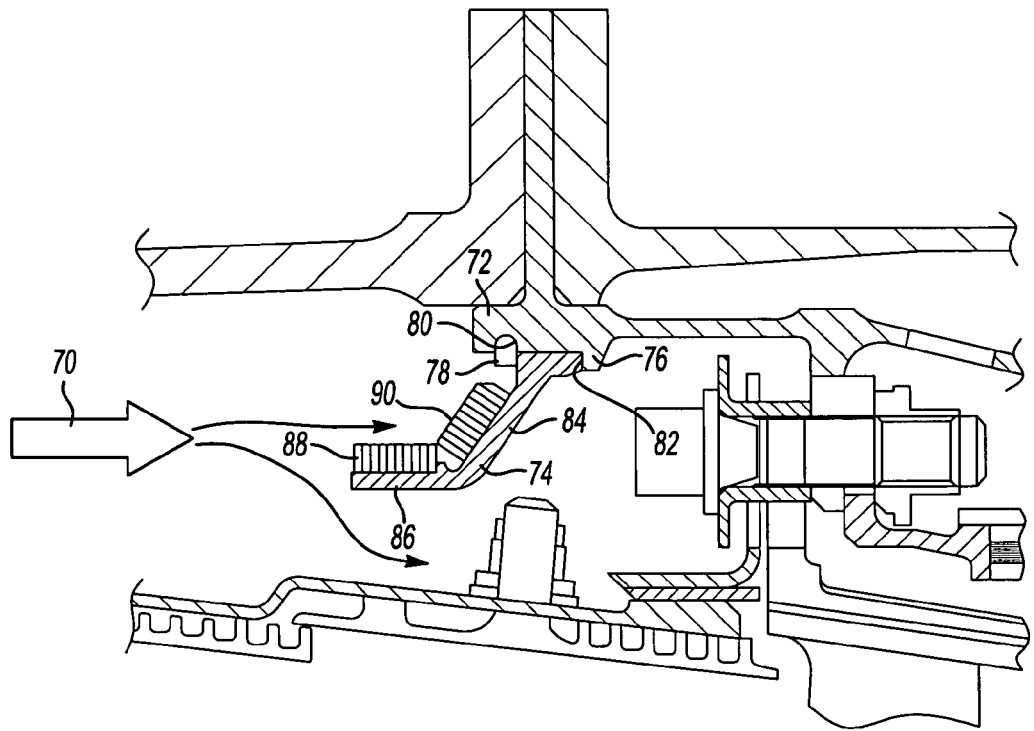
FIG. 4A shows a first embodiment of the present invention.

FIG. 4A is an embodiment of a particle collector 74. As shown, the particle collector 74 is attached to a housing member 72 with an axial retention face 76. A split retaining ring 78 is received in a groove 80 in the housing 72, and forces a mounting surface 82 of the particle collector 74 against the axial retention face 76.

As shown in this embodiment, the particle collector 74 includes a first axially and radially inwardly extending surface 84, and a second generally axially extending surface 86. Particle collection materials 88 and 90 are placed on surfaces 86 and 84, respectively.

Figure 4B:
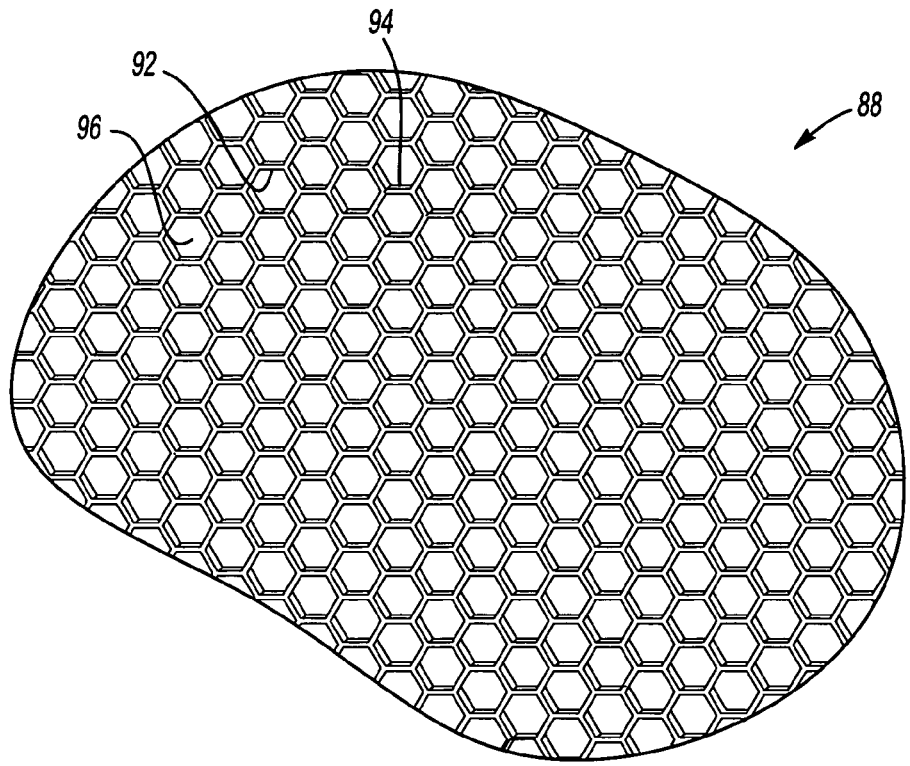
FIG. 4B is an end view of a honeycombed material according to the present invention.

When the secondary air flow 70 passes towards the particle collector 74, the heavier dirt-laden air will tend to pass radially outwardly and onto the collection surfaces 88 and 90. Having the collection surfaces be on planes transverse to each other increases the amount of surface that is exposed to the dirt. As shown in FIG. 4B, the disclosed materials 88 and 90 have a honeycombed shape with intersecting walls 92 and 94, defining a plurality of collection spaces 96. The dirt or other impurities is received within these collection spaces 96.

Figure 5:
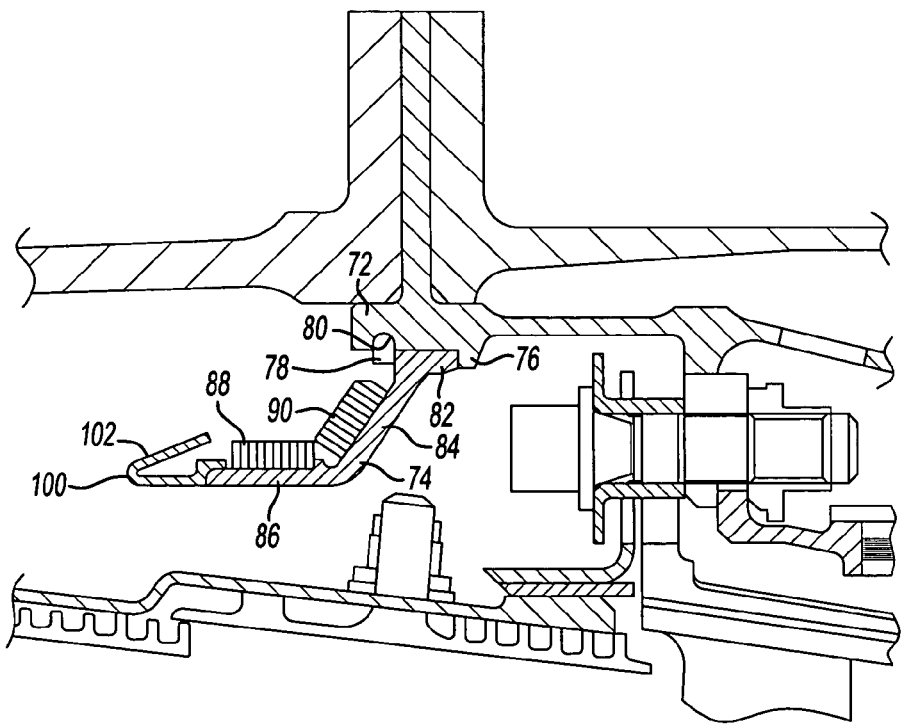
FIG. 5 shows another embodiment of the present invention.
Figure 6:
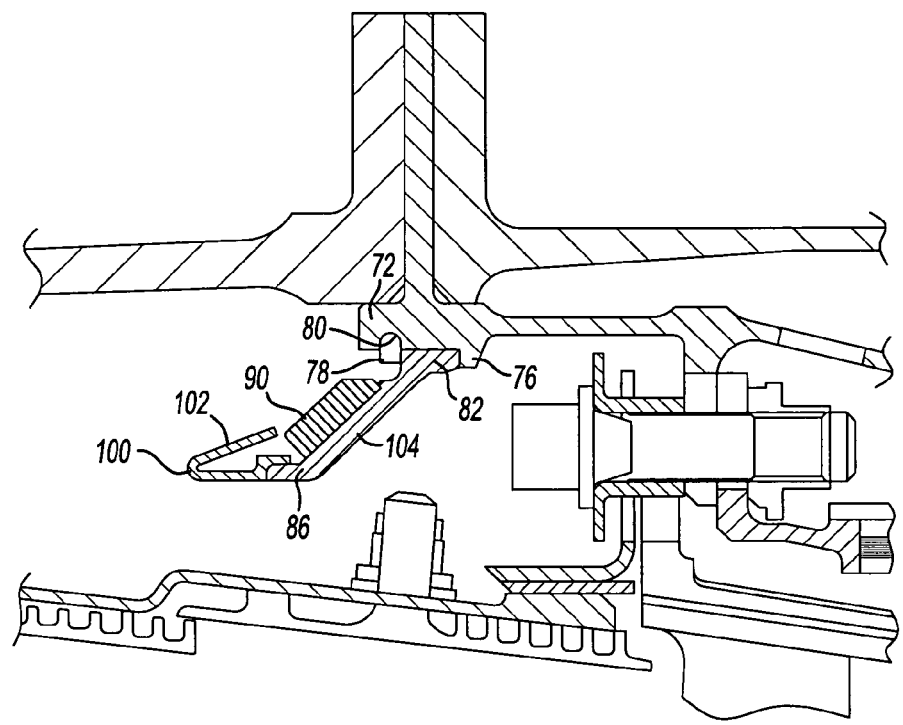
FIG. 6 shows yet another embodiment of the present invention.

FIG. 5 shows another embodiment, which is similar to the FIG. 4A embodiment, however, a flow guide 100 has a ramped surface 102 to guide the heavier dirt-laden air radially outwardly. FIG. 6 shows yet another embodiment wherein the particle collector 104 has only a single surface 90.

Figure 7:
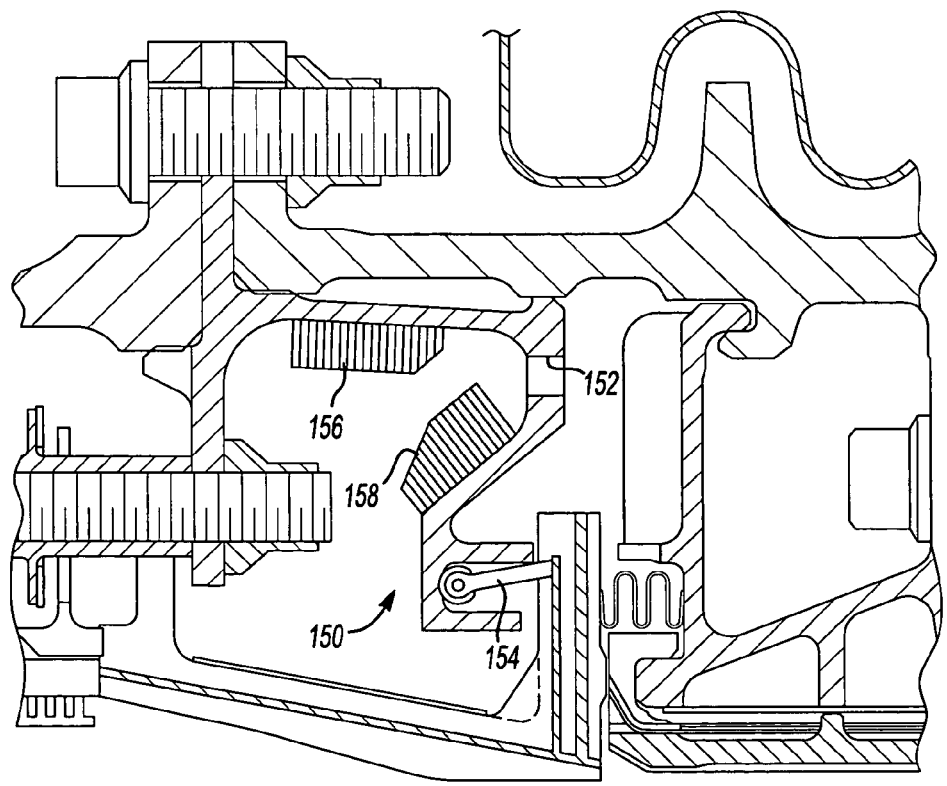
FIG. 7 shows yet another embodiment of the present invention.

FIG. 7 shows yet another embodiment 150, wherein a metering hole 152 controls cooling air flow. Such structures are known in gas turbine engines. As shown, particle collection materials 156 and 158 are placed in the path of an air flow approaching the metering hole 152. In fact, as can be seen, a radially outermost portion of the material 158 partially "shadows" the metering hole 152. Said another way, a projected cross-sectional area of the metering hole 152 would pass through a portion of the collection material 158.

As can be appreciated, the disclosed locations of each of the collection material in the various embodiments is such that the collection materials lie on a plane having at least a component in a direction parallel to the axial center line of the gas turbine engine (line 12—see FIG. 1). Further, many of the materials are in a plane that has both a component in that direction, and a component perpendicular to that direction. These orientations are believed the most effective in removing impurities from the air, and retaining those impurities in the collection spaces.

While specific locations for the particle collectors are shown, the present invention is directed to including such particle collectors at locations through which a cooling air flow is likely to pass. The particle collectors are preferably honeycombed, and may have as an example, a cell size of 0.062" nominal hexagonal shape. Thicknesses of 0.0037-0.0043" are used in the prior abradable seal material. However, other sizes may be utilized. Moreover, while honeycombs are disclosed, other shapes having a plurality of dirt collection spaces can be utilized.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine comprising:
a combustion section; a turbine section downstream of said combustion section, said turbine section including at least one stationary vane, at least one rotating turbine blade, and at least one blade outer air seal, at least one of said at least one stationary vane, said at least one turbine blade and said at least one blade outer air seal to be provided with a cooling air stream; and a collection material to be placed in the cooling air stream for collecting impurities, said collection material having an outer face including a plurality of impurity collection spaces, said collection material being placed downstream of said combustion section, and upstream of at least a portion of said turbine section, and said collection material being placed such that dirt-laden portions of the cooling air stream will pass along the collection material, while cleaner air will pass radially inwardly of the collection material.

2. The gas turbine engine as set forth in claim 1, wherein the cooling air stream is to be supplied to each of said at least one stationary vane, at least one rotating turbine blade, and said blade outer air seal.

3. The gas turbine engine as set forth in claim 1, wherein said collection spaces of said collection material have a honeycombed shape.

4. The gas turbine engine as set forth in claim 1, wherein said collection material is mounted on a particle collector member, and there being at least one particle collection material portion extending along a plane that is transverse to an axial center line of said gas turbine engine.

5. The gas turbine as set forth in claim 1, wherein said collection material is mounted on a particle collector member, and there being at least one particle collection material portion extending along a plane that is transverse to an axial center line of said gas turbine engine.

6. The gas turbine engine as set forth in claim 1, wherein a flow guide will guide heavier dirt-laden air toward said collection material.

7. The gas turbine engine as set forth in claim 1, wherein said collection material lies along a plane, said plane having at least a component which is parallel to an axial center line of the gas turbine engine.

8. The gas turbine engine as set forth in claim 7, wherein said plane also has a component which is generally perpendicular to said axial center line.

9. The gas turbine engine as set forth in claim 1, wherein said cooling air stream passes through a metering hole, and said collection material placed upstream and adjacent to said metering hole.

10. The gas turbine engine as set forth in claim 9, wherein said collection material is at least partially within an extended cross-sectional area of the metering hole.

11. A dirt collection material for being placed in a cooling air flow of a gas turbine engine comprising: a first collection material including a first outer face, the first collection material is mounted in a gas turbine engine such that the outer face is in contact with the cooling air flow; a second collection material having a second outer face that is parallel to an axial center line of the gas turbine engine; said both faces having a plurality of impurity collection spaces; and said first and second collection material are mounted on a particle collector member, and the particle collection member having a portion extending along a plane that will be transverse to said axial center line of the gas turbine engine.

12. The collection material as set forth in claim 11, wherein said face of said first and second collection material has a honeycomb shape.

13. The collection material as set forth in claim 11, wherein a flow guide will guide heavier dirt-laden air toward said first and second collection material.

14. The collection material as set forth in claim 11, wherein the cooling air flow passes through a metering hole, and said first and second collection material to be placed upstream and adjacent to the metering hole.

15. The collection material as set forth in claim 14, wherein said collection material is at least partially within an extended cross-sectional area of the metering hole.

16. The collection material as set forth in claim 11, wherein said collection member includes a second section having an axial centerline that is generally parallel to the axial centerline of the gas turbine engine that is to receive the first collection material.

* * * * *